United States Patent [19]

Campbell, Jr.

[11] Patent Number: 5,420,485

[45] Date of Patent: May 30, 1995

[54] UNCOORDINATED MACHINE INITIALIZATION SYSTEM AND METHOD

[75] Inventor: Robert L. Campbell, Jr., Hickory, N.C.

[73] Assignee: Forcam Inc., Hickory, N.C.

[21] Appl. No.: 109,660

[22] Filed: Aug. 20, 1993

[51] Int. Cl.$^6$ .................................................. H02P 1/54
[52] U.S. Cl. ........................................ 318/34; 318/45; 318/47; 318/51; 318/53; 318/41
[58] Field of Search ................ 318/34, 45, 47, 51, 318/53, 41

[56] References Cited

U.S. PATENT DOCUMENTS

| | | |
|---|---|---|
| 4,084,083 | 4/1978 | McNally et al. |
| 4,289,997 | 9/1981 | Jung et al. ........................ 318/51 |
| 4,752,867 | 6/1988 | Backe et al. |
| 4,827,195 | 5/1989 | Newell et al. |
| 4,862,380 | 8/1989 | Kawamura et al. |
| 4,879,644 | 11/1989 | Gottshall |
| 4,939,431 | 7/1990 | Yamazaki et al. ................ 318/41 |
| 4,949,025 | 8/1990 | Iwagaya et al. |
| 4,963,803 | 9/1990 | Kokura |
| 4,987,359 | 1/1991 | Saitoh |
| 5,006,766 | 4/1991 | Yuhas et al. ..................... 318/53 |
| 5,013,989 | 5/1991 | Kurakake et al. |
| 5,084,660 | 1/1992 | Sasaki et al. |
| 5,136,222 | 8/1992 | Yamamoto et al. ............... 318/51 |
| 5,202,611 | 4/1993 | Uehara et al. ................... 318/41 |
| 5,241,250 | 8/1993 | Nagasawa ....................... 318/34 |
| 5,248,922 | 9/1993 | Meshkat ......................... 318/51 |

Primary Examiner—William M. Shoop, Jr.
Assistant Examiner—Karen Masih
Attorney, Agent, or Firm—Bell, Seltzer, Park & Gibson

[57] ABSTRACT

A system and method for initializing a plurality of mechanical elements of a machine includes a plurality of housings and an uncoordinated motion controller. The housings are coupled to the mechanical elements and include at least a motor controller electrically connected to a motor. Each of the motor controllers have an associated position sensing component for sensing the position of the associated mechanical element along one axis. The uncoordinated motion controller instructs the motor controllers to operate its associated motor until the associated mechanical element reaches an initialization position. The velocity and acceleration profile of the respective motors are independent of each other, such that each of the motors moves its associated mechanical element in uncoordinated motion until each mechanical element reaches its initialization position. A multi-node daisy chained data bus electrically connects the uncoordinated motion controlling means and the motor controllers in series.

34 Claims, 5 Drawing Sheets

UNCOORDINATED MACHINE INITIALIZATION SYSTEM AND METHOD

FIELD OF THE INVENTION

The invention relates to the field of mechanical machine control systems, and more particularly to machine initialization systems and associated methods.

BACKGROUND OF THE INVENTION

A typical mechanical machine, such as is used in the woodworking or textile industries, commonly utilizes multiple mechanical elements, often referred to as tools, for a single batch run. Each tool requires a particular setup position for a particular job. For example, a woodworking machine, such as a tenoner, may have thirty or more cutting tools. Different fabrication runs may require changing most, if not all, the positions of the various tool heads. The tool head positions are usually controlled by a slide or adjusting screw crank for each axis of motion. The setting and resetting of these tools is very time consuming if done manually. The down time of a machine that is reset manually is exacerbated by current practices of small special order batch fabrication runs.

Automatic setup of these machines has taken two different approaches, each with significant drawbacks. Both approaches commonly require placing a servo mechanism at each slide or crank. Each servo requires at least a gearhead motor, an encoder for feedback, and axis limit switches.

The first conventional approach involves individually hardwiring each automating component (motors, encoders, switches, etc.) of every servo into a central controller which then regulates all of the servos. Unfortunately, the wiring requirements for such a central controller are complex since multiple wires need to run from each servo component to the central controller. The wiring then often costs more than the entire system, and the conversion is complicated.

The second conventional approach to automating the setup of these machines is to place highly sophisticated processors and controls at each servo. The installation costs are therefore lowered, however, the control hardware and the accompanying complex software costs are excessive. In summary, conventional machine initialization approaches require either manual initialization, which demands too much time, or sophisticated devices for automatic initialization, which demand too much control hardware, too much software, and too much investment.

SUMMARY OF THE INVENTION

It is therefore an object of the present invention to provide an automatic machine initialization system and method.

It is a further object of the present invention to provide an initialization system and method which does not require complex control hardware and/or software.

These and other objects according to the present invention are provided by a system for initializing a plurality of mechanical elements, such as woodworking tool heads, in a machine, such as a tenoner. The initialization system includes a plurality of servo control housings and an uncoordinated motion controller. The housings, each of which are mechanically coupled to an associated mechanical element, contain a motor and a motor controller. Each of the motor controllers has an associated sensor, such as a linear encoder, for sensing the position of the associated mechanical element.

The uncoordinated motion controller instructs each motor controller to operate its associated motor, at a velocity and acceleration profile which is independent of the remaining motors, until the associated mechanical element reaches an initialization position. Thus, each motor moves its associated mechanical element in uncoordinated motion until each mechanical element reaches its associated initialization position.

The uncoordinated motion controller includes means for issuing a plurality of initialization command sequences to the motor controllers. Each of the command sequences contains a motor controller identification and an associated initialization position. Each motor controller responds to such an initialization command sequence by moving its associated mechanical element to the indicated initialization position. The uncoordinated motion controller further includes means for issuing an initialization completion request, which includes a motor controller identification. Each motor controller responds to receipt of an initialization completion request by indicating to the uncoordinated motion controller whether the initialization position has been reached.

A multi-node daisy chained data bus, preferably an RS-485 bus, electrically connects the uncoordinated motion controller and the motor controllers in series. A single power line is similarly daisy chained and provides power to the housings and the uncoordinated motion controller.

The present invention stems from the realization that in initializing a machine's mechanical elements, the velocity and position of the mechanical elements in travelling to an initialization position is unimportant. Thus, complex controllers for controlling their travel is not necessary. All that is really necessary is a relatively simple system for telling each controller where to go. Accordingly, complex controllers are not required.

DESCRIPTION OF PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1A:
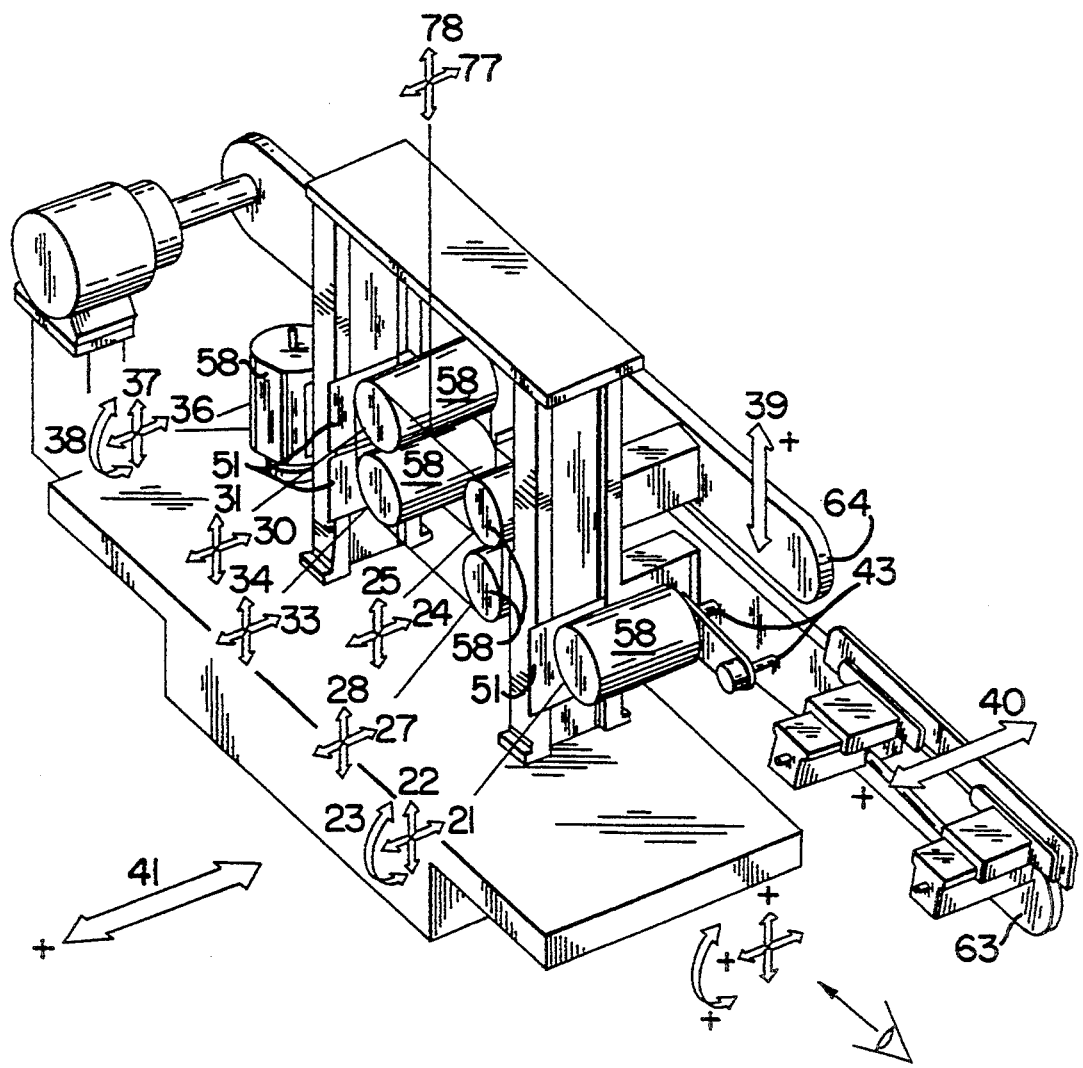
FIGS. 1A and 1B illustrate schematic perspective views of a tenoner without an initialization system according to the present invention.
Figure 1B:
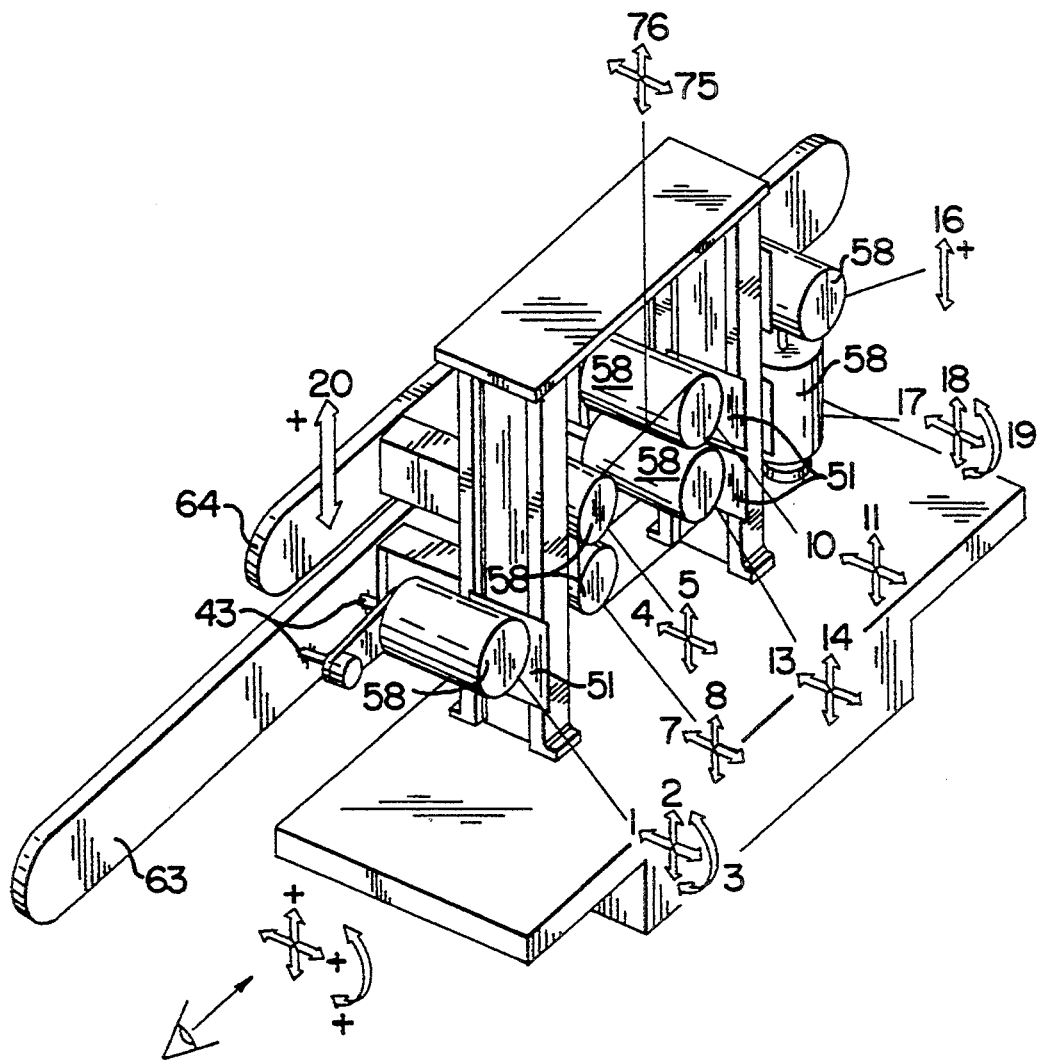

FIGS. 1A and 1B respectively illustrate two halves of a woodworking machine commonly known as a tenoner. The tenoner as represented in FIGS. 1A and 1B is split in half at approximately a forty-five degree angle for illustration purposes. In reality, the two halves operate from approximately four inches to eight feet apart in a parallel working relationship. Wood travels along chain beams 63 and underneath hold down beams 64 between the two halves and are processed by the various mechanical elements coupled to the tenoner. Thirteen mechanical elements (not shown) such as trimming blades, coping blades, and other cutting devices are mechanically coupled by spindles 43 to corresponding spindle motors 58.

Each of the wood working units, consisting of the mechanical elements, spindles 43, and spindle motors 58 are mounted on tool carriers 51 which in turn are supported by tool posts 44. All of the illustrated tool carriers 51 can be moved by gibs, for example, in at least one axis, most of them in two axes, and some of them in three axes. The horizontal axis 1, 4, 7, 10, 13, 17, 21, 24, 27, 30, 33, 36 of each working unit, the vertical axis 2, 5, 8, 11, 14, 18, 22, 25, 28, 31, 34, 37, 16 of each working unit, and the rotational axis 3, 19, 23, 38 of each working unit may be adjusted to a variety of positions for any number of different woodworking jobs.

Figure 2:
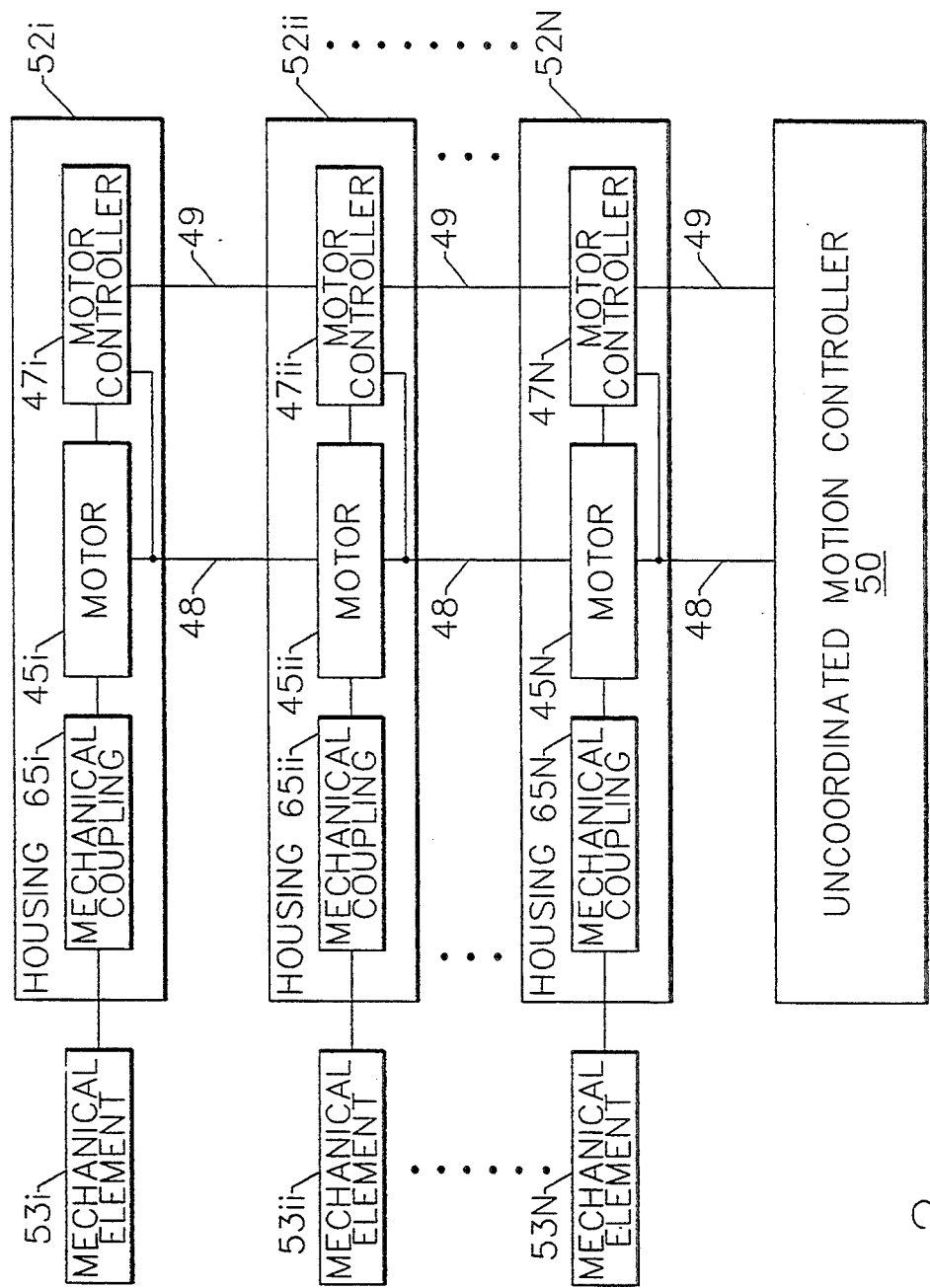
FIG. 2 illustrates a block diagram of an initialization system according to the present invention.

The present invention, illustrated in FIG. 2, places a housing $52_{i-N}$ at each mechanical element $53_{i-N}$, such as a slide, adjusting screw crank, butterfly valve, etc. Each housing $52_{i-N}$ includes a gearhead motor $45_{i-N}$ controlled by a motor controller $47_{i-N}$. In addition, a mechanical coupling $65_{i-N}$ joins the mechanical element $53_{i-N}$ with the gearhead motor $45_{i-N}$. Accordingly, distributed control is provided such that each of said gearhead motors $45_{i-N}$ moves the associated mechanical element $53_{i-N}$ in uncoordinated motion until each mechanical element $53_{i-N}$ reaches its associated initialization position.

Each housing 52 needs only a power wire 48 and a communications link 49. The wires 48, 49 are daisy chained from one housing 52 to another. An uncoordinated motion controller 50 controls all of the housings 52 in the ring. Because each housing 52 is controlled by its independent motor controller 47, all housings 52 can operate either sequentially or simultaneously.

Figure 3:
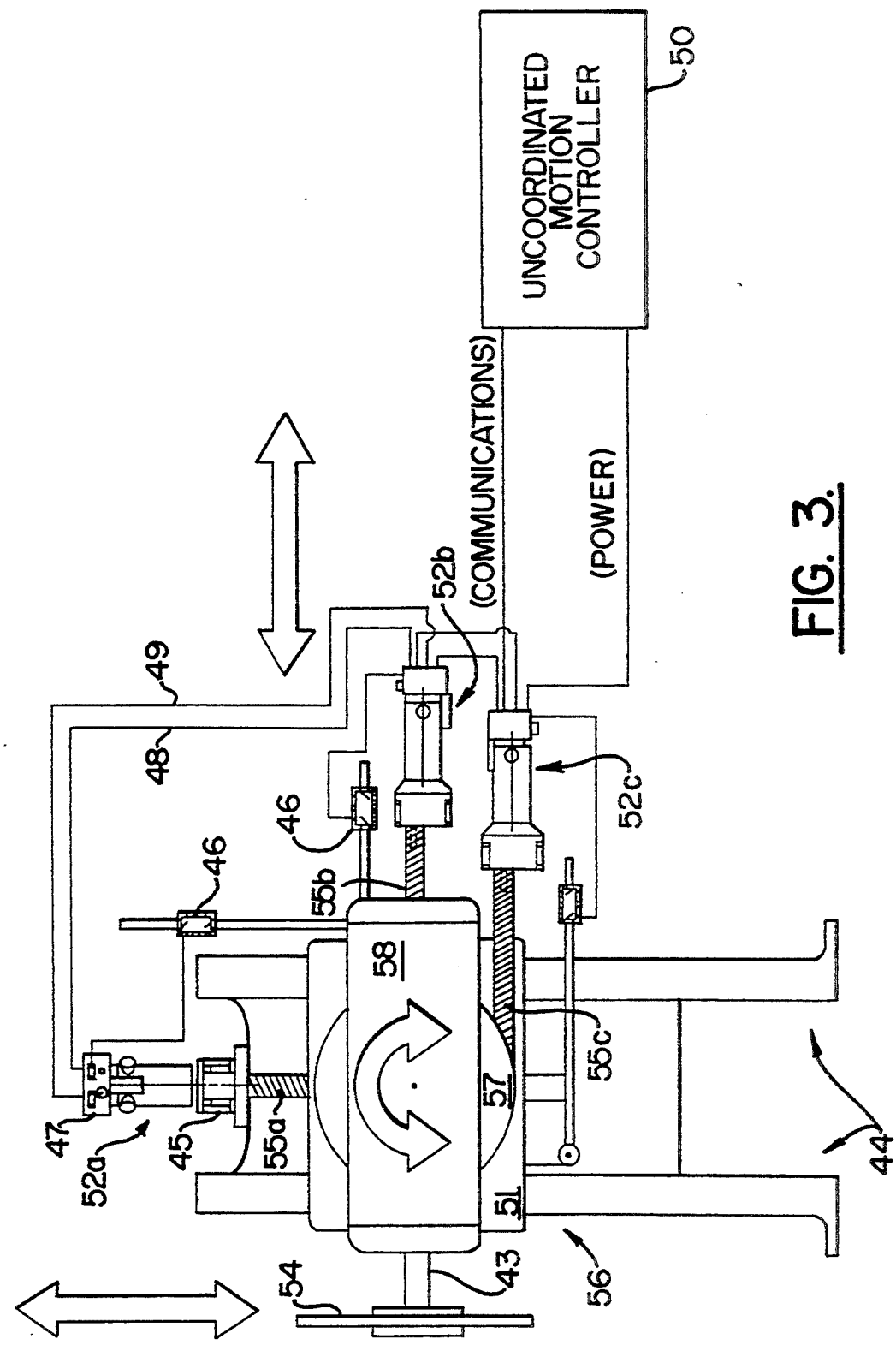
FIG. 3 illustrates a single arm with three axes of motion and associated initialization systems according to the present invention.

One arm or tool carrier 51, mounted on a tool post 44, holds a working unit 56 of another machine in FIG. 3. A dozen or more tool carriers 51 may be situated on a machine around a work project, which may involve, for example, wood or textiles. Three housings 52a, 52b, 52c control the three axes of an associated mechanical element, here a circular cutting blade 54. Thus, the first housing 52a is coupled to a first lead screw 55a to move the working unit 56 vertically, the second housing 52b is connected to a second lead screw 55b to move the working unit 56 horizontally, and the third housing 52c is connected to a third lead screw 55c to move the working unit 56 radially. A turntable 57 facilitates radial motion under control of the third housing 52c. Once in place, a spindle motor 58 controls the speed of the cutting blade 54.

Figure 4:
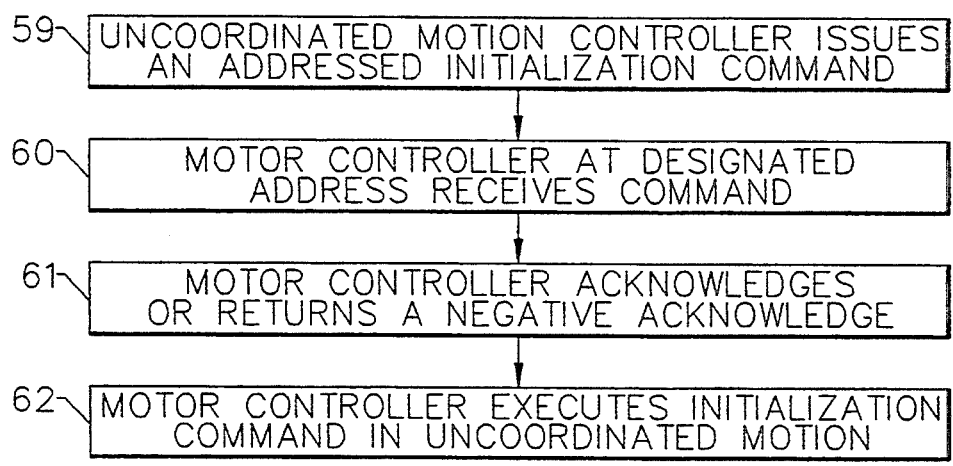
FIG. 4 is an operations block diagram for initializing a machine according to the invention.

The overall operation of uncoordinated initialization is schematically illustrated by a block diagram in FIG. 4. In a first step 59, the uncoordinated motion controller 50 issues an addressed initialization command. In a second step 60, the addressed motor controller 47 receives the command. Then, in a third step 61, the motor controller 47 acknowledges the command or returns a negative acknowledge. In a fourth step 62, the motor controller 47 executes the initialization command in uncoordinated motion.

A detailed implementation of a system and method for uncoordinated machine initialization according to the invention will now be provided. A local area network (LAN) serves as the system link, to convey position control commands from the uncoordinated motion controller 50 to the motor controllers 47 utilizing a multi-point differential communication bus 49. The uncoordinated motion controller 50 sends instructions to the motor controllers 47 which indicate new positions for each automated axis. The motor controllers 47, without further host interaction, will then take the necessary action to move each automated axis into position. Significantly, no coordination of any kind is necessary among or between the various control motors 47. On a periodic basis, the uncoordinated motion controller 50 polls each motor controller 47 to determine if the corresponding axis has reached its target position.

The LAN is a multi-drop data network, in which all the motor controllers 47 are serially connected to the uncoordinated motion controller 50 through a commonly shared transmission line. The LAN consists of the uncoordinated motion controller 50, the motor controllers 47, and a communications bus 49, which is preferably an RS-485 data bus. The RS-485 bus is a two wire differential bus which is highly immune to electrical interference. It was developed to provide multi-point (multi-node) capability in a half or full duplex mode of operation. The RS-485 bus also allows communications cables to extend up to 4000 feet in total length. Each motor controller 47 is identified on the network via a node address. This address is set on each motor controller 47 utilizing an addressing component, such as a conventional seven position dip switch. Then, each motor controller 47 monitors the communications link 49 to detect messages which are addressed to it.

To avoid data collisions on the network, the LAN supports a master/slave communications structure. Thus, the uncoordinated motion controller 50 is the network master, and the motor controllers 47 are slaves. Accordingly, the uncoordinated motion controller 50 must initiate all network communications, and the motor controllers 47 can only respond. For example, after the uncoordinated motion controller 50 has issued a command, the addressed motor controller 47 will begin to send its response within 30 milliseconds.

Data is preferably transmitted across the network utilizing a standard NRZ asynchronous transmission format. A specific data byte format may therefore have an eight bit word length with the least significant bit first. The eighth bit of the address byte may thus indicate a new message. The format includes no parity, one stop bit, and a baud transmission speed of 9600. This character framing format is compatible with off the shelf Universal Asynchronous Receiver Transmitters (UART).

Communications between the uncoordinated motion controller 50 and the motor controllers 47 take place through network message packets. Messages from the uncoordinated motion controller 50 are always commands and messages from the motor controllers 47 are always command responses. After the uncoordinated motion controller 50 sends a network command to one of the motor controllers 47, the motor controller 47 decodes and executes the command received and returns the appropriate response.

Messages from both the uncoordinated motion controller 50 and the motor controllers 47 have the following general format:

| byte 1 | byte 2 | byte 3 | byte n | byte n + 1 |
|---|---|---|---|---|
| Node Address | Header | Bytes to Follow | Data Bytes | Check Sum |

The node address field of the network message string identifies the intended recipient of the network message when issued from the uncoordinated motion controller 50. When a reply is transmitted from a motor controller 47, the node address identifies the controller 47 responding. When the uncoordinated motion controller 50 issues a network command, the most significant bit (MSB) of the node address byte should be set. This indicates to all motor controllers 47 that a new message is being sent. When a motor controller 47 responds to a command, the MSB of the node address field should not be set.

The header field is preferably a one byte command code or response code that identifies the uncoordinated motion controller 50 command or motor controller 47 response. A complete list of commands and command responses are more fully described below. The bytes to follow field is also preferably a one byte field indicating the number of bytes to follow including the checksum.

After the bytes to follow field, a number of data bytes may be present which contain information needed to complete the command sent from the uncoordinated motion controller 50. In a response packet from a motor controller 47, data bytes may be present as a result of executing a specific command. An example of this would be a request for the current position of a motor controller 47. The checksum field is included for error detection. The checksum value is computed by summing all of the bytes in the packet (8 bit sum) and then logically ANDing the result with 7FH.

Data packets traveling the network will be received by every motor controller 47 in the network. To prevent disruption by a long message string directed to another controller 47, the LAN utilizes the most significant bit of the node address byte. This bit should only be set in the node address of a command packet. The serial port on each motor controller 47 is preferably programmed so that this event will cause all of the controllers 47 on the network to be interrupted to decode the node address byte. Then, only the addressed motor controller 47 will continue to monitor for additional information. All other motor controllers 47 ignore the remainder of the message packet.

Recipients of network messages have the responsibility of computing the checksum of each message received. This value will then be compared with the checksum packaged within the message string. If a match does not occur, an error has been detected during transmission. If a checksum error is detected by a motor controller 47 receiving a command message, the motor controller 47 will return a negative acknowledge (NACK) to the uncoordinated motion controller 50. If a checksum error is detected by the uncoordinated motion controller 50 receiving a response, the uncoordinated motion controller 50 would conclude that the data received is corrupted and re-send the command message.

As stated above, the uncoordinated motion controller 50 sets the most significant bit of the node address byte to indicate the beginning of a new message packet. To represent large values, the data may be broken up into multiple modulo 7 bytes (typically 2 or 4). In standard data storage, the most significant bit is used to represent the sign of the value. Since this would also violate the modulo 7 rule, a separate sign character is sent if the value to be transmitted is a signed data type. This sign byte typically follows the data bytes which it represents. For example, if the sign of the value is negative, then the value of the sign byte may be 1. If the sign of the value is positive, then the value of the sign byte may be 0. The sender translates data to be transmitted from standard format into multiple modulo 7 bytes if necessary. Likewise, the receiver reassembles the modulo 7 data bytes received into a standard data format.

The motor controller 47 represents all positioning data in terms of its associated encoder's minimum measuring resolution. An encoder 46 resolution found to be satisfactory is 0.01 millimeters (approximately 0.0004 inches). Such a minimum resolution is referred to as a unit. Thus, prior to issuing a move command, the uncoordinated motion controller 50 must first convert the position or increment data from inches to units. To complete this step, the uncoordinated motion controller 50 multiplies the value in inches by 2540 and rounds to the nearest whole number. This is the position in units. The unit value is then converted into two or four modulo 7 bytes before being transmitted. Similarly, when receiving positioning information from a motor controller 47, the uncoordinated motion controller 50 must reassemble the modulo 7 bytes into a standard integer format and divide the position in units received by 2540. The result will be a position value with an accuracy of approximately 0.0005 inches.

As explained above, communication between network entities takes place through message packets. The following is a list of possible network commands along with their command code. The command code is the value of the header byte used when transmitting a command message.

| Uncoordinated Motion Controller Commands To Motor Controllers | |
|---|---|
| Commands | Command Code |
| 1. Locate Home | 1 |
| 2. Move to an Absolute location | 2 |
| 3. Move an Incremental Distance | 3 |
| 4. Request Current Motor Controller Status | 4 |
| 5. Request Current Motor Controller Position | 5 |
| 6. Request Current Motor Controller Segment Offset | 6 |
| 7. Request Current Motor Controller Mark Count | 7 |
| 8. Future Use | 8 |
| 9. Send Setup Data to Motor Controller | 9 |
| 10. Future Use | 10 |
| 11. Move Until Hardware Interrupted | 11 |
| 12. Report Position of Hardware Interrupt | 12 |
| 13. Instruct Motor Controller to go Idle (STOP) | 13 |
| 14. Instruct Motor Controller to Cage/Free Limits | 14 |

Each of these commands will now be described in detail.

1. Locate Home

A locate home command format is illustrated by the following table.

| Byte 1 | 01H to 7FH + 80H | Node Address |
|---|---|---|
| Byte 2 | 1 | Command Code (header) |
| Byte 3 | 2 | Bytes to Follow |
| Byte 4 | Home Control Byte | |
| Byte 5 | Checksum | |

Upon receiving the locate home command string, the addressed motor controller 47 will proceed to find the motor's home position in the manner prescribed by the home control byte. For example, if the value of the home control byte is 1, then the motor's upper limit will be used for the home position. Likewise, if the value of the home control is 0, then the motor's lower limit will be used for the home position. The possible responses of the motor control is an acknowledge or a negative acknowledge response. If the response is acknowledged, then the uncoordinated motion controller 50 can send a request to the motor controller 47 to identify whether the motor controller 47 stopped on the low or the high limit. If the response is a negative acknowledge, then the uncoordinated motion controller 50 can repeat the original command.

2. Move to an Absolute Location

An absolute location move command format is illustrated by the following table.

| Byte 1 | 01H to 7FH + 80H | Node Address |
|---|---|---|
| Byte 2 | 2 | Command Code (Header) |
| Byte 3 | 10 | Bytes to Follow |
| Byte 4 | Position Hi Byte | |
| Byte 5 | Position Mid Byte 1 | |
| Byte 6 | Position Byte 2 | |
| Byte 7 | Position Low byte | |
| Byte 8 | Tolerance Hi Byte | |
| Byte 9 | Tolerance Mid Byte 1 | |
| Byte 10 | Tolerance Mid Byte 2 | |
| Byte 11 | Tolerance Low Byte | |
| Byte 12 | Sign of Position 1 = Neg 0 = Pos | |
| Byte 13 | Checksum | |

After receiving the move to an absolute position command, the addressed motor controller 47 will move its axis to the position programmed in the command string using the tolerance specified. The motor controller 47 responds with an acknowledge response or a negative acknowledge response.

3. Move an Incremental Distance

An incremental distance command format is illustrated by the following table.

| Byte 1 | 01H to 7FH + 80H | Node Address |
|---|---|---|
| Byte 2 | 2 | Command Code (Header) |
| Byte 3 | 10 | Bytes to Follow |
| Byte 4 | Position Hi Byte | |
| Byte 5 | Position Mid Byte 1 | |
| Byte 6 | Position Byte 2 | |
| Byte 7 | Position Low byte | |
| Byte 8 | Tolerance Hi Byte | |
| Byte 9 | Tolerance Mid Byte 1 | |
| Byte 10 | Tolerance Mid Byte 2 | |
| Byte 11 | Tolerance Low Byte | |
| Byte 12 | Sign of Position 1 = Neg 0 = Pos | |
| Byte 13 | Checksum | |

After receiving a move an incremental distance command, the addressed motor controller 47 will move its axis to the position programmed in the command string using the tolerance specified. The motor controller 47 responds with an acknowledge response or a negative acknowledge response.

4. Current Motor Controller Status Request

A current motor controller 47 status command format is illustrated by the following table.

| Byte 1 | 01H to 7FH + 80H | Node Address |
|---|---|---|
| Byte 2 | 4 | Command Code |
| Byte 3 | 1 | Bytes to Follow |
| Byte 4 | Checksum | |

This command string will instruct the motor controller 47 to send its current encoder 46 position. The motor controller 47 responds with a motor status response or a negative acknowledge response. The motor status responses are discussed in further detail below.

5. Current Motor Controller Position Request

A format illustrating a current motor controller 47 position command is illustrated by the following table.

| Byte 1 | 01H to 7FH + 80 | Node Address |
|---|---|---|
| Byte 2 | 5 | Command Code |
| Byte 3 | 1 | Bytes to Follow |
| Byte 4 | Checksum | |

This position command string will instruct the motor controller 47 to send its current status. The motor controller 47 responds with a motor position response or a negative acknowledge response.

6. Current Motor Controller Offset Request

A format for current motor controller 47 segment offset commands is illustrated by the following table.

| Byte 1 | 01H to 7FH + 80 | Node Address |
|---|---|---|
| Byte 2 | 6 | Command Code |
| Byte 3 | 1 | Bytes to Follow |
| Byte 4 | Checksum | |

The segment offset command string will instruct the motor controller 47 to send its current segment offset. The segment offset is used to determine if the axis has moved since the motor controller 47 was last powered down. Prior to powering down the system, the uncoordinated motion controller 50 must request the current segment offset from each motor controller 47 and store each value in non-volatile memory. When the system is next powered up, the uncoordinated motion controller 50 will then send back the segment offset to each motor controller 47. If the value downloaded is the same as the current offset (or within a pre-defined tolerance), the motor controller 47 will assume that its previous position has been relatively unchanged. Using its present segment offset and the downloaded mark count, the motor controller 47 will be able to determine its current position from home without homing the axis. The motor controller 47 responds with a segment offset response or a negative acknowledge response.

7. Current Motor Controller Mark Count

A current mark count command format is illustrated by the following table.

| Byte 1 | 01H to 7FH + 80H | Node Address |
|---|---|---|
| Byte 2 | 7 | Command Code |
| Byte 3 | 1 | Bytes to Follow |

| | | |
|---|---|---|
| Byte 4 | Checksum | |

This command string will instruct the motor controller 47 to send its mark count value. Each mark count represents, for example, a 0.200 inch distance from the motor controller's home position. By multiplying the value of the mark count by 0.200 inches and then adding the segment offset, the motor controller 47 can rebuild its previous position. This information is used by the motor controller 47 to determine the axis position on power-up. The motor controller 47 responds with a mark count response or a negative acknowledge response.

9. Sending Setup Data to Motor Controller

A data setup command format is illustrated by the following table.

| | | |
|---|---|---|
| Byte 1 | 01H to 7FH + 80H | Node Address |
| Byte 2 | 9 | Command Code (header) |
| Byte 3 | 35 | Bytes to Follow |
| Byte 4 | Overshoot/Backlash High Byte | |
| Byte 5 | Overshoot/Blash Low Byte | |
| Byte 6 | Target-in-range high byte | |
| Byte 7 | Target-in-range low byte | |
| Byte 8 | Rotation Control | |
| Byte 9 | Approach Direction | |
| Byte 10 | Drift Tolerance High Byte | |
| Byte 11 | Drift Tolerance Low Byte | |
| Byte 12 | Low Soft Limit High Byte | |
| Byte 13 | Low Soft Limit Mid Byte | |
| Byte 14 | Low Soft Limit Mid Byte | |
| Byte 15 | Low Soft Limit Low Byte | |
| Byte 16 | Sign for Low Soft Limit 1 = Neg 0 = Pos | |
| Byte 17 | High Soft Limit High Byte | |
| Byte 18 | High Soft Limit Mid Byte | |
| Byte 19 | High Soft Limit Mid Byte | |
| Byte 20 | High Soft Limit Low Byte | |
| Byte 21 | Sign for High Soft Limit 1 = Neg 0 = Pos | |
| Byte 22 | Home Value High Byte | |
| Byte 23 | Home Value Mid Byte | |
| Byte 24 | Home Value Mid Byte | |
| Byte 25 | Home Value Low Byte | |
| Byte 26 | Sign for Home Value 1 = Neg 0 = Pos | |
| Byte 27 | Encoder Direction | |
| Byte 28 | Segment Offset High Byte | |
| Byte 29 | Segment Offset Mid Byte | |
| Byte 30 | Segment Offset Mid Byte | |
| Byte 31 | Segment Offset Low Byte | |
| Byte 32 | Mark Count High Byte | |
| Byte 33 | Mark Count Low Byte | |
| Byte 34 | Sign for Mark Count 1 = Neg 0 = Pos | |
| Byte 35 | Segment Offset Tolerance High Byte | |
| Byte 36 | Segment Offset Tolerance Low Byte | |
| Byte 37 | Bound Time 1 = 20 milliseconds | |
| Byte 38 | Checksum | |

After receiving this command, the addressed motor controller 47 will store all of the information in memory and then attempt to rebuild its position based on the downloaded segment offset and mark count values. If the previous position is recovered, the motor controller 47 will have the homed bit set whenever it is polled for status. The motor controller 47 responds with an acknowledge response or a negative acknowledge response.

The overshoot/backlash is the distance used to overcome backlash in the axis screw. When positioning the axis, the motor controller 47 will always approach its target position from the same direction. If the target position is in the opposite direction for normal approach, then the motor controller 47 will overshoot the target position by approximately this value and begin approaching the target. A value range from 0 to 16,384 units (0 to 6.45 inches) has been found to be adequate.

The target-in-range is the distance limit at which the motor controller 47 changes its approach to the target position from full speed. The motor controller 47 then begins stepping into position from this range. The value that is downloaded is used on the first positioning move. After the first move, the motor controller 47 calculates a new target-in-range value for each move. This will compensate for variations in how smoothly an axis moves on a daily basis. A value range from 0 to 16,384 units (0 to 6.45 inches) has been found to be adequate.

The rotation control field controls the rotation direction of the axis when a position command is issued. By varying this field between 0 and 1, the motor controller 47 will operate the motor in either a clockwise or counter-clockwise direction when a positive distance move command is issued.

The approach direction field controls the approach direction from the positive direction or the negative direction. The motor controller 47 always approaches the target from the same direction. This helps to compensate for error induced by gravity or by friction variations.

The drift tolerance field is used by the motor controller 47 to determine if an axis has drifted out of position once placed into position by the uncoordinated motion controller 50. If the axis drifts outside of this prescribed tolerance, then the motor controller 47 will indicate position drift when polled for status.

The lower soft limit represents the lowest position to which the motor controller 47 can move its axis. This value is typically a position between the home limit switch and "0.0". Once downloaded, if the uncoordinated motion controller 50 issues a position command which exceeds this value, the motor controller 47 will return a NACK. A range of 0 to 268435456 units (0 to 105,683.25 inches) has been found to be adequate The field representing the sign for the lower soft limit is used because the network uses the MSB of the address byte to represent a new message and no other packet byte should have the MSB set. If the lower soft limit is negative, the value at this location should be 1. If the value of the lower soft limit is positive, then the value at this location should be 0.

The upper soft limit represents the highest position to which the motor controller 47 can move its axis. This value is typically a position below the upper limit switch. Once downloaded, if the uncoordinated motion controller 50 issues a position command which exceeds this value, then the motor controller 47 will return a NACK. A range of 0 to 268435456 units (0 to 105,683.25 inches) has been found to be adequate.

The field representing the sign for upper soft limit is controlled similarly to the sign of the lower soft limit. If the sign of the limit is negative, then the value at this location should be 1. If the sign of the upper soft limit is positive, then the value at this location should be 0.

The home value number represents the starting position of the axis after the motor controller 47 has been "homed". This value is typically 0. A range of 0 to 268435456 units (0 to 105,683:25 inches) has been found to be adequate. The sign for the home value field is comparable to the soft limit sign fields.

The encoder 46 direction byte indicates to the motor controller 47 which direction is positive to the encoder 46. The value of this byte should be either 0 or 1.

The segment offset value represents the last known segment offset that was received from the motor controller 47. The segment offset signifies the encoder 46 distance from a reference mark on the encoder 46 slide. This value is used by the motor controller 47 in an attempt to determine if the axis has been moved while the system was powered down. This segment offset value is derived from a previous request for the segment offset and should always be positive.

The mark count value represents the last known mark count received from the motor controller 47. This value is the current number of marks (increments of 0.200 inches) from position 0.0. Once downloaded, the motor controller 47 will use this value in an attempt to rebuild its position after power-up. The sign for the mark count should be 1 if the value of the mark count is negative, and should be 0 if the value is positive.

The segment offset tolerance value indicates the amount of variation that is allowed between the current segment offset and the downloaded value. If the difference between the offsets is within this tolerance, then the motor controller 47 will attempt to rebuild its position after downloading the setup data. If the difference between offsets is outside this tolerance, then the motor controller 47 will not attempt to rebuild its position. An adequate range for this value has been found to be 0 to 16384 units (0 to 6.45 inches).

The bound time field sets the amount of time an axis can be bound before the motor controller 47 will go to an idle condition. The range of this value may be 1 to 127, with each increment representing 20 millisecond steps.

11. Move Until Hardware Interrupted

A move until hardware interrupt command format is illustrated by the following table.

| Byte 1 | 01H to 7FH + 80 | Node Address |
|---|---|---|
| Byte 2 | 11 | Command Code |
| Byte 3 | 2 | Bytes to Follow |
| Byte 4 | Search Direction | |
| Byte 5 | Checksum | |

After receiving this command, the addressed motor controller 47 will begin moving the axis in the direction indicated (positive or negative direction). The motor controller 47 will continue to move the axis until either an external hardware interrupt is detected or until a limit is reached. When a hardware interrupt is detected, the motor controller 47 will stop moving and record the position where the interrupt was detected. Possible responses from a motor controller 47 to the command are an acknowledge response or a negative acknowledge response.

12. Hardware Interrupt Position Report

A position of hardware interrupt request format is illustrated by the following table.

| Byte 1 | 01H to 7FH + 80H | Node Address |
|---|---|---|
| Byte 2 | 12 | Command Code |
| Byte 3 | 1 | Bytes to Follow |
| Byte 4 | Checksum | |

The position of hardware interrupt request command string instructs the motor controller 47 to report the position where the hardware interrupt occurred. The possible responses from the motor controller 47 are an acknowledge response or a negative acknowledge response.

13. Instruct Motor Controller to go Idle

A motor controller 47 go to idle (STOP) command format is illustrated by the following table.

| Byte 1 | 01H to 7FH + 80H | Node Address |
|---|---|---|
| Byte 2 | 13 | Command Code |
| Byte 3 | 1 | Bytes to Follow |
| Byte 4 | Checksum | |

This command string instructs the motor controller 47 to go to an idle state. When received, the motor controller 47 should immediately go to idle. The in-position bit of the status word will indicate if the axis is out of position when polled for status. The possible responses from the motor controller 47 are a positive acknowledge response or a negative acknowledge response.

14. Instruct Motor Controller to Cage/Free Limits

A motor controller 47 cage/free limits command format is illustrated in the following table.

| Byte 1 | 01H to 7FH + 80II | Node Address |
|---|---|---|
| Byte 2 | 14 | Command Code |
| Byte 3 | 2 | Bytes to Follow |
| Byte 4 | Axis State | |
| Byte 5 | Checksum | |

After receiving the motor controller 47 cage/free limits command, the addressed motor controller 47 will either cage or free its axis limits depending on the axis state data byte sent. When an axis is caged (default), the motor controller 47 will honor all soft and hard limits. If the axis is free, the controller will override all limits and allow movement even if the axis has not been homed. An axis should never be left in a free state during normal operation. Possible responses from a motor controller 47 are an acknowledge response or a negative acknowledge response.

The motor controller 47 response codes and packet formats are limited to those necessary for uncoordinated control.

| Command Response | | Response Codes |
|---|---|---|
| 1. | Positive Acknowledge | 7FH |
| 2. | Negative Acknowledge | 7EH |
| 3. | Motor Status | 7DH |
| 4. | Current Motor Position | 7CH |
| 5. | Current Segment Offset | 7BH |
| 6. | Position of hardware interrupt | 7AH |
| 7. | Current Mark Count | 79H |

Each of these commands will now be described in detail.

1. Positive Acknowledge

A positive acknowledge response format is illustrated by the following table.

| Byte 1 | 01H to 7FH | Node Address |
|---|---|---|
| Byte 2 | 7FH | Command Code |
| Byte 3 | 1 | Bytes to Follow |
| Byte 4 | Checksum | |

A positive acknowledge response is sent to the uncoordinated motion controller 50 to acknowledge that an error free command has been decoded. This response is used when no return data is expected by the uncoordinated motion controller 50.

2. Negative Acknowledge

A negative acknowledge response format is illustrated by the following table.

| Byte 1 | 01H to 7FH | Node Address |
|---|---|---|
| Byte 2 | 7EH | Command Code |
| Byte 3 | 1 | Bytes to Follow |
| Byte 4 | Checksum | |

This response is sent to the uncoordinated motion controller 50 whenever a checksum comparison has failed. It is also sent when a move command is issued that exceeds the soft limits or when a move command is issued and the axis has not been homed or the position re-built.

3. Motor Status

A motor status response is sent by a motor controller 47 in response to a request status command. It informs the uncoordinated motion controller 50 of the current status of the motor controller 47. A motor status response format is illustrated by the following table.

| Byte 1 | 01H to 7FH | Node Address |
|---|---|---|
| Byte 2 | 7DH | Command Code (header) |
| Byte 3 | 3 | Bytes to Follow |
| Byte 4 | Status High Byte | |
| Byte 5 | Status Low Byte | |
| Byte 6 | Checksum | |

The bit values of status bytes 4 and 5 are as follows.

| Name | Bits | Value | Detail |
|---|---|---|---|
| Position | 0 | 0 | Motor is in position |
| | | 1 | Motor has drifted |
| Busy | 1 | 0 | Motor is Idle |
| | | 1 | Motor is moving |
| Homed | 2 | 1 | Position known |
| | | | Position unknown |
| Cmd Error | 3 | 1 | Command-Input Error |
| | | 0 | No Command Input Error |
| Limit Status | 4-5 | 0 | Axis In Between Limits |
| | | 1 | Axis at Low Limits |
| | | 2 | Axis at Hi Limits |
| Control Error | 6-7 | 0 | Normal, no errors |
| | | 1 | Axis on home switch |
| | | 2 | Soft limit error |
| | | 3 | Axis bound error |
| Cage/Free | 8 | 0 | Axis caged (limits) |
| | | 1 | Axis free (no limits) |

4. Current Motor Position

A current position response is sent to the uncoordinated motion controller 50 as a result of a request for the current motor controller 47 position. The value returned may be represented in units as four modulo 7 bytes. The sign of the value return may be stored in the sign byte. For example, if the sign of the value is 1, then the position returned is negative. If the sign of the value is 0, then the position returned is positive. A current position response format is illustrated by the following table.

| Byte 1 | 01H to 7FH | Node Address |
|---|---|---|
| Byte 2 | 7CH | Command Code (header) |
| Byte 3 | 6 | Bytes to Follow |
| Byte 5 | Position Mid Byte 1 | |
| Byte 6 | Position Bid Byte 2 | |
| Byte 7 | Position Low Byte | |
| Byte 8 | Position Sign | |
| | 0 = Pos 1 = Neg | |
| Byte 9 | Checksum | |

5. Current Segment Offset

A current segment offset response is sent to the uncoordinated motion controller 50 as a result of a request for the current motor controller 47 segment offset. The value returned may be represented in units as four modulo 7 bytes. A format for the current segment offset response is illustrated by the table below.

| Byte 1 | 01H to 7FH | Node Address |
|---|---|---|
| Byte 2 | 7BH | Command Code (header) |
| Byte 3 | 5 | Bytes to Follow |
| Byte 4 | Offset High Byte | |
| Byte 5 | Offset Mid Byte 1 | |
| Byte 6 | Offset Mid Byte 2 | |
| Byte 7 | Offset Low Byte | |
| Byte 8 | Checksum | |

6. Position of Hardware Interrupt

A position of hardware interrupt is sent to the uncoordinated motion controller 50 as a result of a of hardware interrupt position command. The position returned is preferably represented in units as four modulo 7 bytes. The sign of the position returned may be stored in the sign byte. A format for the hardware interrupt response is illustrated by the table below.

| Byte 1 | 01H to 7FH | Node Address |
|---|---|---|
| Byte 2 | 7AH | Command Code (header) |
| Byte 3 | 6 | Bytes to Follow |
| Byte 4 | Position High Byte | |
| Byte 5 | Position Mid Byte 1 | |
| Byte 6 | Position Bid Byte 2 | |
| Byte 7 | Position Low Byte | |
| Byte 8 | Position Sign | |
| | 0 = Neg, 1 = Pos | |
| Byte 9 | Checksum | |

7. Current Mark Count

A current mark count response is sent to the uncoordinated motion controller 50 as a result of a request for the current motor controller 47 mark count. The value returned may be represented as two modulo 7 bytes. If the sign of mark count is negative, then the sign byte should be 1. If the sign of the mark count is positive, then the sign byte should be 0. A current mark count response format is illustrated by the table below.

| Byte 1 | 01H to 7FH | Node Address |
|---|---|---|
| Byte 2 | 79H | Command Code (header) |
| Byte 3 | 4 | Bytes to Follow |
| Byte 4 | Mark Count High Byte | |
| Byte 5 | Mark Count Low Byte | |
| Byte 6 | Mark Count Sign | |
| | 1 = Neg 0 = Pos | |

| Byte 7 | Checksum |

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed:

1. A system for initializing a plurality of mechanical elements in a machine, comprising:
   a plurality of housings, each housing containing a motor controller, a motor electrically coupled to the motor controller, and means for mechanically coupling the motor to one of the mechanical elements; and
   uncoordinated motion initializing means, electrically connected to each of said motor controllers, for instructing said motor controllers to operate the associated motor subsequent to the time an initialization command is received and until the associated mechanical element reaches an initialization position, such that each of said motors moves the associated mechanical element in uncoordinated motion until each mechanical element reaches the associated initialization position.

2. A system according to claim 1 wherein said uncoordinated motion initializing means comprises means for issuing a plurality of initialization commands to said motor controllers, wherein each of said motor controllers is responsive to an initialization command for moving the associated mechanical element to the indicated initialization position, and wherein each of said commands comprises a motor controller identification and an associated initialization position.

3. A system according to claim 2 wherein said uncoordinated motion initializing means further comprises means for issuing an initialization completion request including a motor controller identification; and wherein each of said motor controllers is responsive to receipt of an initialization completion request, for indicating to said uncoordinated motion initializing means whether said initialization position has been reached.

4. A system according to claim 1 wherein said uncoordinated motion initializing means instructs said motor controllers to simultaneously operate the associated motors until the associated mechanical elements reach an initialization position such that each of said motors moves the associated mechanical element in simultaneous and uncoordinated motion until each mechanical element reaches the associated initialization position.

5. A system according to claim 1 wherein said uncoordinated motion initializing means instructs said motor controllers to sequentially operate the associated motors until the associated mechanical elements reach an initialization position such that each of said motors moves the associated mechanical element in sequential and uncoordinated motion until each mechanical element reaches the associated initialization position.

6. A system for initializing a plurality of mechanical elements in a machine, comprising:
   a plurality of housings, each housing containing a motor controller, a motor electrically coupled to the motor controller, and means for mechanically coupling the motor to one of the mechanical elements; and
   uncoordinated motion controlling means, electrically connected to each of said motor controllers, for instructing said motor controllers to operate the associated motor until the associated mechanical element reaches an initialization position, at a velocity and acceleration profile which is independent of the remaining motors, such that each of said motors moves the associated mechanical element in uncoordinated motion until each mechanical element reaches the associated initialization position;
   wherein said motor controllers include means for sensing the position of the associated mechanical element.

7. A system according to claim 6 wherein said means for sensing the position of the associated mechanical element includes one of a linear encoder and a rotary encoder.

8. A system according to claim 1 wherein said uncoordinated motion initializing means is a master controller, and wherein said motor controllers are slave controllers which are unable to initiate any communication with said master controller.

9. A system for initializing a plurality of mechanical elements in a machine, comprising:
   a plurality of housings, each housing containing a motor controller, a motor electrically coupled to the motor controller, and means for mechanically coupling the motor to one of the mechanical elements; and
   uncoordinated motion controlling means, electrically connected to each of said motor controllers, for instructing said motor controllers to operate the associated motor until the associated mechanical element reaches an initialization position, such that each of said motors moves the associated mechanical element in uncoordinated motion until each mechanical element reaches the associated initialization position;
   wherein said motor controllers further comprise means for detecting an error in a message received from said uncoordinated motion controlling means.

10. A system for initializing a plurality of mechanical elements in a machine, comprising:
    a plurality of housings, each housing containing a motor controller, a motor electrically coupled to the motor controller, and means for mechanically coupling the motor to one of the mechanical elements; and
    uncoordinated motion controlling means, electrically connected to each of said motor controllers, for instructing said motor controller to operate the associated motor until the associated mechanical element reaches an initialization position, such that each of said motors moves the associated mechanical element in uncoordinated motion until each mechanical element reaches the associated initialization position;
    wherein said uncoordinated motion controlling means further comprises means for detecting an error in a message received from one of said motor controllers.

11. A system according to claims 9 or 10 wherein said means for detecting an error in a received message is a checksum means for comparing a checksum of each received message with a checksum packaged within a message string.

12. A system for initializing a plurality of mechanical elements in a machine, comprising:

a plurality of housings, each housing containing a motor controller, a motor electrically coupled to the motor controller, and means for mechanically coupling the motor to one of the mechanical elements;

uncoordinated motion initializing means for instructing said motor controllers to operate the associated motor subsequent to the time an initialization command is received and until the associated mechanical element reaches an initialization position, such that each of said motors moves the associated mechanical element in uncoordinated motion until each mechanical element reaches the associated initialization position; and means for electrically connecting said uncoordinated motion initializing means and said motor controllers in series.

13. A system according to claim 12 wherein said means for electrically connecting comprises a multinode daisy chained data bus.

14. A system according to claim 13 wherein said data bus is an RS-485 data bus.

15. A system according to claim 12 wherein said uncoordinated motion initializing means comprises means for issuing a plurality of initialization commands to said motor controllers, wherein each of said motor controllers is responsive to an initialization command for moving the associated mechanical element to the indicated initialization position, and wherein each of said commands comprises a motor controller identification and an associated initialization position.

16. A system according to claim 12 wherein said uncoordinated motion initializing means further comprises means for issuing an initialization completion request including a motor controller identification; and wherein each of said motor controllers is responsive to receipt of an initialization completion request, for indicating to said uncoordinated motion initializing means whether said initialization position has been reached.

17. A system according to claim 12 wherein said uncoordinated motion initializing means instructs said motor controllers to simultaneously operate the associated motors until the associated mechanical elements reach an initialization position such that each of said motors moves the associated mechanical element in simultaneous and uncoordinated motion until each mechanical element reaches the associated initialization position.

18. A system according to claim 12 wherein said uncoordinated motion initializing means instructs said motor controllers to sequentially operate the associated motors until the associated mechanical elements reach an initialization position such that each of said motors moves the associated mechanical element in sequential and uncoordinated motion until each mechanical element reaches the associated initialization position.

19. A system for initializing a plurality of mechanical elements in a machine, comprising:

a plurality of housings, each housing containing a motor controller, a motor electrically coupled to the motor controller, and means for mechanically coupling the motor to one of the mechanical elements;

uncoordinated motion controlling means for instructing said motor controllers to operate the associated motor until the associated mechanical element reaches an initialization position, such that each of said motors moves the associated mechanical element in uncoordinated motion until each mechanical element reaches the associated initialization position; and means for electrically connecting said uncoordinated motion controlling means and said motor controllers in series;

wherein said motor controllers include means for sensing the position of the associated mechanical element.

20. A system according to claim 19 wherein said means for sensing the position of the associated mechanical element includes one of a linear encoder and a rotary encoder.

21. A system according to claim 12 wherein said uncoordinated motion initializing means is a master controller, and wherein said motor controllers are slave controllers which are unable to initiate any communication with said uncoordinated motion initializing means.

22. A system for initializing a plurality of mechanical elements in a machine, comprising:

a plurality of housings, each housing containing a motor controller, a motor electrically coupled to the motor controller, and means for mechanically coupling the motor to one of the mechanical elements;

uncoordinated motion controlling means for instructing said motor controllers to operate the associated motor until the associated mechanical element reaches an initialization position, such that each of said motors moves the associated mechanical element in uncoordinated motion until each mechanical element reaches the associated initialization position; and means for electrically connecting said uncoordinated motion controlling means and said motor controllers in series;

wherein said motor controllers further comprise means for detecting an error in a message received from said uncoordinated motion controlling means.

23. A system for initializing a plurality of mechanical elements in a machine, comprising:

a plurality of housings, each housing containing a motor controller, a motor electrically coupled to the motor controller, and means for mechanically coupling the motor to one of the mechanical elements;

uncoordinated motion controlling means for instructing said motor controllers to operate the associated motor until the associated mechanical element reaches an initialization position, such that each of said motors moves the associated mechanical element in uncoordinated motion until each mechanical element reaches the associated initialization position; and means for electrically connecting said uncoordinated motion controlling means and said motor controllers in series;

wherein said uncoordinated motion controlling means further comprises means for detecting an error in a message received from one of said motor controllers.

24. A system according to claims 22 or 23 wherein said means for detecting an error in a received message is a checksum means for comparing a checksum of each received message with a checksum packaged within a message string.

25. A system for initializing a plurality of mechanical elements in a machine, comprising:

a plurality of housings, each housing containing a motor controller, each of said motor controllers having means for sensing the position of the associated mechanical element, a motor electrically coupled to the motor controller, and means for mechanically coupling the motor to one of the mechanical elements;

uncoordinated motion controlling means for instructing said motor controllers to simultaneously or sequentially operate the associated motor until the associated mechanical element reaches an initialization position, such that each of said motors moves the associated mechanical element in simultaneous or sequential uncoordinated motion until each mechanical element reaches the associated initialization position, wherein said uncoordinated motion controlling means is a master controller, and wherein said motor controllers are slave controllers which are unable to initiate any communication with said uncoordinated motion controlling means, said uncoordinated motion controlling means comprising means for issuing a plurality of initialization command sequences to said motor controllers, wherein each of said motor controllers is responsive to an initialization command sequence for moving the associated mechanical element to the indicated initialization position, and wherein each of said command sequences comprises a motor controller identification and an associated initialization position, and wherein said uncoordinated motion controlling means further comprises means for issuing an initialization completion request including a motor controller identification, and wherein each of said motor controllers is responsive to receipt of an initialization completion request, for indicating to said uncoordinated motion controlling means whether said initialization position has been reached; and a multi-node daisy chained data bus for electrically connecting said uncoordinated motion controlling means and said motor controllers in series.

26. A system for initializing a plurality of mechanical elements in a machine, comprising:

a plurality of motor controllers;

a plurality of motors, a respective one of which is electrically coupled to an associated motor controller;

a plurality of mechanical couplings, a respective one of which is coupled to an associated motor, for coupling the associated motor to an associated one of the mechanical elements; and uncoordinated motion initializing means, electrically connected to each of said motor controllers, for instructing said motor controllers to operate the associated motor subsequent to the time an initialization command is received and until the associated mechanical element reaches an initialization position, such that each of said motors moves the associated mechanical element in uncoordinated motion until each mechanical element reaches the associated initialization position.

27. A system according to claim 26 wherein said uncoordinated motion initializing means comprises means for issuing a plurality of initialization commands to said motor controllers, wherein each of said motor controllers is responsive to an initialization commands for moving the associated mechanical element to the indicated initialization position, and wherein each of said commands comprises a motor controller identification and an associated initialization position.

28. A system according to claim 27 wherein said uncoordinated motion initializing means further comprises means for issuing an initialization completion request including a motor controller identification; and wherein each of said motor controllers is responsive to receipt of an initialization completion request, for indicating to said uncoordinated motion initializing means whether said initialization position has been reached.

29. A system according to claim 26 wherein said uncoordinated motion initializing means instructs said motor controllers to simultaneously operate the associated motors until the associated mechanical elements reach an initialization position such that each of said motors moves the associated mechanical element in simultaneous and uncoordinated motion until each mechanical element reaches the associated initialization position.

30. A system according to claim 26 wherein said uncoordinated motion initializing means instructs said motor controllers to sequentially operate the associated motors until the associated mechanical elements reach an initialization position such that each of said motors moves the associated mechanical element in sequential and uncoordinated motion until each mechanical element reaches the associated initialization position.

31. A system according to claim 26 wherein said uncoordinated motion initializing means is a master controller, and wherein said motor controllers are slave controllers which are unable to initiate any communication with said master controller.

32. A method for initializing a plurality of mechanical elements in a machine, each mechanical element including a motor coupled thereto, said method comprising the step of:

initializing said plurality of motors by instructing each of the motors to move the associated mechanical element subsequent to the time an initialization command is received and until the associated mechanical element reaches an initialization position, such that each of the motors moves the associated mechanical element in uncoordinated motion until each mechanical element reaches the associated initialization position.

33. A method according to claim 32 wherein said instructing step comprises the step of instructing said motors to simultaneously operate until the associated mechanical elements reach an initialization position, such that each of said motors moves the associated mechanical element in simultaneous and uncoordinated motion until each mechanical element reaches the associated initialization position.

34. A method according to claim 32 wherein said instructing step comprises the step of instructing said motors to sequentially operate until the associated mechanical elements reach an initialization position, such that each of said motors moves the associated mechanical element in sequential and uncoordinated motion until each mechanical element reaches the associated initialization position.

* * * * *